United States Patent
Mok et al.

(10) Patent No.: US 11,961,177 B2
(45) Date of Patent: Apr. 16, 2024

(54) DISPLAY DEVICE FOR RENDERING VIEWPOINT IMAGES AND OUTPUTTING A 3D IMAGE AND METHOD OF CONTROLLING THE DISPLAY DEVICE

(71) Applicants: SAMSUNG DISPLAY CO., LTD., Yongin-si (KR); MAXST CO., LTD., Seoul (KR)

(72) Inventors: Rang Kyun Mok, Seoul (KR); Ji Young Choi, Seoul (KR); Gi Seok Kwon, Yongin-si (KR); Jae Joong Kwon, Suwon-si (KR); Beom Shik Kim, Seoul (KR); Jae Wan Park, Anyang-si (KR)

(73) Assignees: SAMSUNG DISPLAY CO., LTD., Yongin-si (KR); MAXST CO., LTD., Seoul (KR)

( * ) Notice: Subject to any disclaimer, the term of this patent is extended or adjusted under 35 U.S.C. 154(b) by 102 days.

(21) Appl. No.: 17/492,981

(22) Filed: Oct. 4, 2021

(65) Prior Publication Data
US 2022/0230381 A1 Jul. 21, 2022

(30) Foreign Application Priority Data
Jan. 18, 2021 (KR) ........................ 10-2021-0006743

(51) Int. Cl.
*G06T 19/00* (2011.01)
*G06T 15/00* (2011.01)
(Continued)

(52) U.S. Cl.
CPC ............ *G06T 15/20* (2013.01); *G06T 15/005* (2013.01); *G06T 15/04* (2013.01); *G06T 19/006* (2013.01); *G06T 19/20* (2013.01)

(58) Field of Classification Search
None
See application file for complete search history.

(56) References Cited

U.S. PATENT DOCUMENTS

| 9,846,965 B2 | 12/2017 | Mitchell et al. |
| 2013/0169837 A1* | 7/2013 | Nagasaka ............. G06T 11/003 348/222.1 |

(Continued)

FOREIGN PATENT DOCUMENTS

| KR | 10-0953747 | 4/2010 |
| KR | 10-2015-0098975 | 8/2015 |

(Continued)

OTHER PUBLICATIONS

Marc Levoy, Pat Hanrahan, "Light Field Rendering", 1996, Seminal Graphics Papers: Pushing the Boundaries, vol. 2(2023, Article 47, pp. 441-452) (Year: 1996).*

(Continued)

*Primary Examiner* — Michael J Cobb
(74) *Attorney, Agent, or Firm* — F. Chau & Associates, LLC

(57) ABSTRACT

A method of controlling a display device includes rendering a plurality of viewpoint images, generating a plurality of sub-images based on the plurality of viewpoint images and a plurality of mapping pattern images corresponding to the plurality of viewpoint images, generating a single light-field image based on the plurality of sub-images, and outputting the single light-field image.

11 Claims, 14 Drawing Sheets

(51) Int. Cl.
      *G06T 15/04*      (2011.01)
      *G06T 15/20*      (2011.01)
      *G06T 19/20*      (2011.01)

(56) References Cited

U.S. PATENT DOCUMENTS

| | | | |
|---|---|---|---|
| 2018/0012397 A1* | 1/2018 | Carothers | G06T 19/006 |
| 2018/0033209 A1* | 2/2018 | Akeley | G06T 19/20 |
| 2019/0260931 A1* | 8/2019 | Rodriguez | H04N 23/65 |
| 2021/0120225 A1* | 4/2021 | Zhang | G06T 3/0087 |

FOREIGN PATENT DOCUMENTS

| | | |
|---|---|---|
| KR | 10-2017-0141202 | 12/2017 |
| KR | 10-1920740 | 11/2018 |

OTHER PUBLICATIONS

Ivo Ihrke, John Restrepo, and Loïs Mignard-Debise, "Principles of Light Field Imaging", 2016, IEEE Signal Processing Magazine, 33(5):59-69 (Year: 2016).*

Gaochang Wu et al. "Light Field Image Processing: An Overview", 2017, IEEE Journal of Selected Topics in Signal Processing, 11(7):926-954 (Year: 2017).*

* cited by examiner

FIG. 11

|  | PIXEL MAPPING | MAPPING PATTERN IMAGE PROCESSING | | | |
|---|---|---|---|---|---|
| PROCESSED VIEWPOINT NUMBER IN SHADER | 1 | 1 | 2 | 3 | 7 |
| Fps (FRAME PER SECOND) | 2.72 | 3.53 | 5.92 | 7.1 | 8.33 |

FIG. 14

| PERFORMANCE DIFFERENCE ACCORDING TO TOTAL NUMBER OF VIEWPOINTS | 39 VIEWPOINTS | 13 VIEWPOINTS | AVERAGE FPS |
|---|---|---|---|
| | 0 | | 7.7 |
| | | 0 | 19.5 |

DISPLAY DEVICE FOR RENDERING VIEWPOINT IMAGES AND OUTPUTTING A 3D IMAGE AND METHOD OF CONTROLLING THE DISPLAY DEVICE

CROSS-REFERENCE TO RELATED APPLICATION

This application claims priority under 35 U.S.C. § 119 to Korean Patent Application No. 10-2021-0006743, filed on Jan. 18, 2021 in the Korean Intellectual Property Office, the disclosure of which is incorporated by reference herein in its entirety.

TECHNICAL FIELD

Embodiments of the inventive concept relate to a display device for outputting a 3D image, and a method of controlling the display device

DISCUSSION OF RELATED ART

As our information-oriented society evolves, demand for various display devices are ever increasing. Accordingly, a variety of types of display devices such as liquid-crystal display (LCD) devices, plasma display panel (PDP) devices, and organic light-emitting display (OLED) devices are currently in use.

Recently, a three-dimensional (3D) image display device and a viewing-angle control display device, which separately display images of the display device in a space in front of the display device using an optical member, have been developed. A 3D image display device separately displays a left-eye image and a right-eye image to give a viewer 3D experiences through binocular parallax. A viewing-angle control display device separately displays a first viewing angle image and a second viewing angle image so that different images can be displayed to users located at different viewing angles from the display device.

SUMMARY

According to an embodiment of the inventive concept, a method of controlling a display device includes rendering a plurality of viewpoint images, generating a plurality of sub-images based on the plurality of viewpoint images and a plurality of mapping pattern images corresponding to the plurality of viewpoint images, generating a single light-field image based on the plurality of sub-images, and outputting the single light-field image.

Rendering the plurality of viewpoint images may include rendering the plurality of viewpoint images to a plurality of textures, respectively, based on previously stored 3D modeling data.

Generating the plurality of sub-images may include loading the plurality of mapping pattern images, where the plurality of mapping pattern images are previously stored, and calculating color values of the plurality of sub-images based on color values of particular pixel positions of the plurality of viewpoint images and on color values of particular color regions of the plurality of mapping pattern images corresponding to the particular pixel positions.

Calculating the color values of the plurality of sub-images may be performed based on a plurality of sub-color values indicating a plurality of colors and an opacity.

Calculating the color values of the plurality of sub-images may include selectively extracting color values of the plurality of viewpoint images by using the color values of the particular color regions of the plurality of mapping pattern images.

Loading the plurality of mapping pattern images may include loading a mapping pattern image to a texture different from a texture to which the plurality of viewpoint images are rendered.

Generating the plurality of sub-images may be performed by a parallel processing method using a shader.

Outputting the single light-field image may include changing at least one of contents, position, size, or shape of the single light-field image in real time based on a distance to an outside object.

Outputting the single light-field image may include outputting the single light-field image to be superimposed on a real-time image captured by a camera.

The single light-field image may be an augmented reality (AR) image.

According to an embodiment of the inventive concept, a display device includes: an image processing circuit configured to generate a light-field image, a storage circuit configured to store a plurality of mapping pattern images each comprising a plurality of color regions, a display panel configured to display the light-field image, an optical member disposed on the display panel and comprising a plurality of lenses configured to transmit the light-field image toward a plurality of viewing regions, and a control circuit configured to control at least one of the image processing circuit, the storage circuit, and the display panel. The control circuit controls the image processing circuit so that the light-field image is generated based on a plurality of viewpoint images rendered from 3D modeling data and the plurality of mapping pattern images.

The image processing circuit may render the plurality of viewpoint images to a plurality of textures, based on the 3D modeling data previously stored in the storage circuit.

The image processing circuit may calculate color values of a plurality of sub-images based on color values of particular pixel positions of the plurality of viewpoint images and color values of particular color regions of the plurality of mapping pattern images corresponding to the particular pixel positions.

The image processing circuit may selectively extract color values of the plurality of viewpoint images by using the color values of the particular color regions of the plurality of mapping pattern images.

The plurality of color regions may include a first color region of a first color, a second color region of a second color, a third color region of a third color, and a fourth color region of a fourth color. The first color, the second color, the third color, and the fourth color may be different from one another.

The fourth color may be a mixture of at least two of the first color, the second color, and the third color.

The display device may further include a sensor circuit configured to measure a distance between the display device and an outside object. The image processing circuit may change at least one of contents, a position, a size, or a shape of the light-field image in real time based on the distance sensed by the sensor circuit.

The display device may further include a camera circuit configured to capture an image of an outside object. The control circuit may control the image processing circuit so that the light-field image is generated if a marker image is included in the image captured by the camera circuit.

The control circuit may control the image processing circuit so that the light-field image is displayed as it is superimposed on a real-time image captured by the camera circuit by synthesizing the light-field image and the real-time image in real time.

The image processing circuit may process the plurality of viewpoint images and the plurality of mapping pattern images in parallel.

According to an embodiment of the inventive concept, a method of controlling a display device includes rendering a plurality of viewpoint images, generating a plurality of sub-images in parallel by loading a plurality of mapping pattern images that are previously stored and calculating color values of the plurality of sub-images, and merging the plurality of sub-images to generate a single light-field image. Each of the plurality of mapping pattern images may include a plurality of color regions including at least two different colors. The color values of the plurality of sub-images may be calculated based on color values of particular pixel positions of the plurality of viewpoint images and on color values of particular color regions among the plurality of color regions corresponding to the particular pixel positions.

BRIEF DESCRIPTION OF THE DRAWINGS

The above and other aspects and features of the inventive concept will become more apparent by describing in detail embodiments thereof with reference to the attached drawings.

FIG. 11 is a table comparing the number of frames per second between a pixel mapping method and a mapping pattern image processing method according to an embodiment of the inventive concept.

FIG. 14 is a table showing changes in the number of frames per second due to conversion of mapping pattern images according to an embodiment of the inventive concept.

DETAILED DESCRIPTION OF THE EMBODIMENTS

Figure 1:
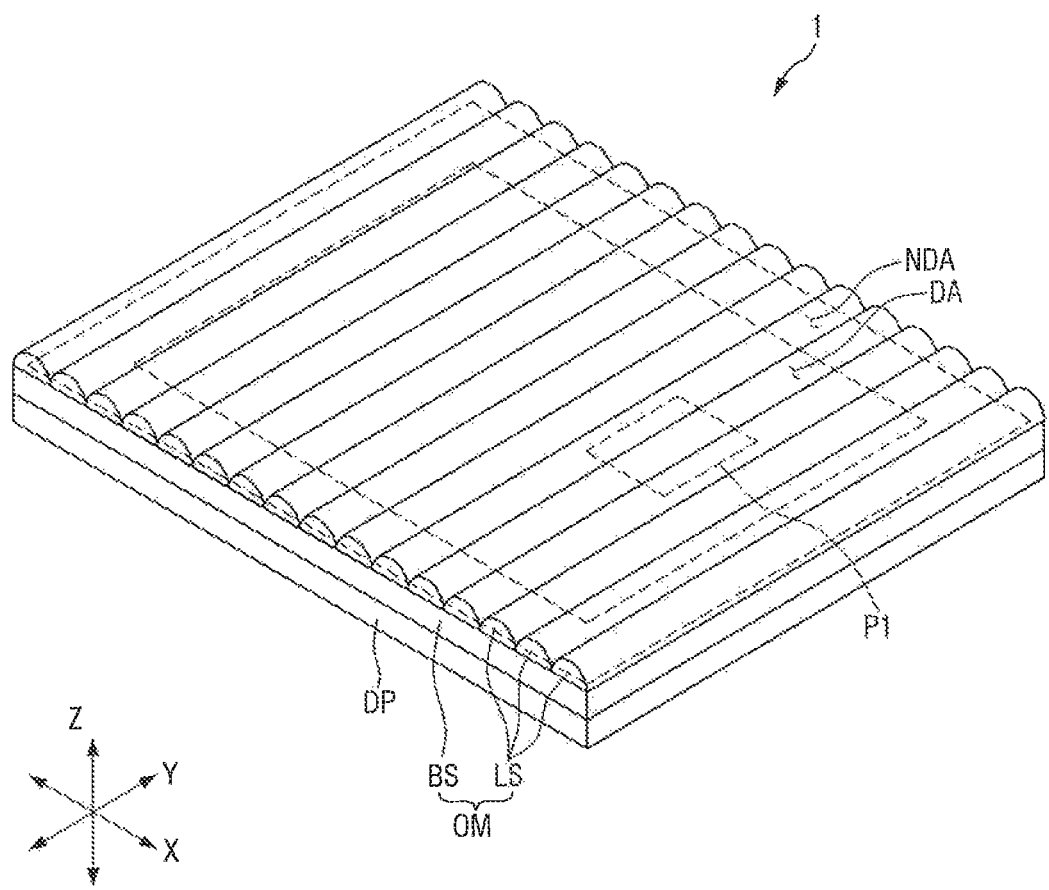
FIG. 1 is a perspective view of a display device according to an embodiment of the inventive concept.

Embodiments of the inventive concept provide a display device with improved image processing speed.

Embodiments of the inventive concept also provide a method of controlling the display device.

Embodiments of the inventive concept will be described more fully hereinafter with reference to the accompanying drawings. Like reference numerals may refer to like elements throughout this application.

Unless otherwise specified, the illustrated embodiments are to be understood as providing features of varying detail of some or a number of ways in which the inventive concept may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concept.

The use of cross-hatching and/or shading in the accompanying drawings is generally provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order.

When an element, such as a layer, is referred to as being "on," "connected to," or "coupled to" another element or layer, it may be directly on, connected to, or coupled to the other element or layer, or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, or ZZ.

As used herein, the term "and/or" includes any and all combinations of one or more of the associated listed items. The terms "and" and "or" may be used in the conjunctive or disjunctive sense, and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element without departing from the teachings of the inventive concept.

The terms "overlap" or "overlapped" may indicate that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as "not overlapping" or "to not overlap" another element, this may include that the elements are spaced apart from each other, offset from each other, or set aside from each other or any other suitable term as would be appreciated and understood by those of ordinary skill in the art.

The terms "face" and "facing" indicates that a first element may directly or indirectly oppose a second element. In a case in which a third element intervenes between the first and second element, the first and second element may be understood as being indirectly opposed to one another, although still facing each other.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, or the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. Additionally, each block, unit, and/or module of some or a number of embodiments may be physically separated into two or more interacting and discrete blocks, units, and/or modules without departing from the scope of the inventive concept. Further, the blocks, units, and/or modules of some or a number of embodiments may be physically combined into more complex blocks, units, and/or modules without departing from the scope of the inventive concept.

FIG. 1 is a perspective view of a display device according to an embodiment of the inventive concept.

In the following description, a first direction X, a second direction Y, and a third direction Z are different directions and cross one another. According to an embodiment of the inventive concept, the first direction X, the second direction Y, and the third direction Z cross one another vertically. The first direction X may be a horizontal direction, the second direction Y may be a vertical direction, and the third direction Z may be a thickness direction. The first direction X, the second direction Y, and/or the third direction Z may include two or more directions. For example, the third direction Z may include an upward direction toward the upper side of the drawings, and a downward direction toward the lower side of the drawings. In this instance, one surface of an element facing the upper side may be referred to as an upper surface, while the opposite surface of the element facing the lower side may be referred to as a lower surface. However, it is to be understood that the above directions are exemplary and relative, and are not limiting.

A display device 1 described below may be a 3D image display device. A 3D image display device separately displays a left-eye image and a right-eye image to give a viewer 3D experiences utilizing binocular parallax. Furthermore, a 3D image display device may separately provide a plurality of viewing angle images in the space in front of the display device 1 so that different images are displayed at different viewing angles.

A 3D image display device may include a light-field display device that allows different image information to be input to viewers' eyes, by disposing members such as barriers and lenticular lenses LS on a display panel DP.

The light-field display device may generate a 3D image by generating a light-field using the display panel DP and a 3D optical system. As described later, light rays generated from the pixels of the display panel DP of the light-field display device form a light field directed to a specific direction (a specific viewing angle and/or a specific viewpoint) by lenses LS, pinholes, or barriers. In this manner, 3D image information corresponding to the specific direction may be provided to the viewer.

Referring to FIG. 1, the display device 1 may include the display panel DP and an optical member OM.

The display panel DP may be a light-emitting display panel DP including light-emitting elements. For example, the display panel DP may include, but is not limited to, an organic light-emitting display panel using organic light-emitting diodes including an organic emissive layer, a micro light-emitting diode display panel using micro LEDs, a quantum-dot light-emitting display panel including quantum-dot light-emitting diodes including an quantum-dot emissive layer, or an inorganic light-emitting display panel using inorganic light-emitting elements including an inorganic semiconductor.

The display panel DP may have a rectangular shape when viewed from the top. The display panel DP may have longer sides in the first direction X and shorter sides in the second direction Y. The corners where the longer sides in the first direction X meet the shorter sides in the second direction Y may be rounded with a predetermined curvature or may be a right angle. The shape of the display panel DP when viewed from the top is not limited to a quadrangular shape, but may be formed in a shape similar to other polygonal shapes, a circular shape, or an elliptical shape.

The display panel DP may include a display area DA, and a non-display area NDA disposed around the display area DA.

In the display area DA, images can be displayed. In the non-display area NDA, images may not be displayed. In the display area DA, a plurality of pixels PX (see FIG. 2) may be disposed. In the non-display area NDA, the plurality of pixels PX may not be disposed.

The non-display area NDA may be disposed around the display area DA to surround at least a part of the display area DA. For example, the display area DA may have a generally rectangular shape when viewed from the top, and the non-display area NDA may be disposed in a band shape surrounding the four edges of the display area DA. It is, however, to be understood that the inventive concept is not limited thereto. The non-display area NDA may be disposed to surround only a part of the display area DA.

The optical member OM may be disposed on the upper surface of the display panel DP. The upper surface of the display panel DP may be the surface on the side where an image and/or video is displayed, and the lower surface of the display panel DP may be the surface opposite to the upper surface. The upper and lower surfaces of the display panel DP may refer to the front and rear surfaces of the display panel DP, respectively.

The optical member OM may include a base member BS and a plurality of lenses LS.

The base member BS may be disposed on the upper surface of the display panel DP. For example, the base member BS may be implemented as a film-type member having a thin or low thickness. The base member BS may be disposed on the display area DA and the non-display area NDA of the display panel DP. It is, however, to be understood that the inventive concept is not limited thereto. The base member BS may be disposed only in the display area DA.

The plurality of lenses LS may be disposed on the upper surface of the base member BS. The plurality of lenses LS may cover at least a part of the upper surface of the base member BS. The plurality of lenses LS may be disposed in the display area DA and the non-display area NDA. It is, however, to be understood that the inventive concept is not limited thereto. The plurality of lenses LS may be disposed only in the display area DA.

The plurality of lenses LS may be arranged at a regular interval to form an array of lenses LS. The plurality of lenses LS may be, but is not limited to, slanted lenses LS extended in a direction inclined with respect to the first direction X and the second direction Y when viewed from the top. The plurality of lenses LS may be extended parallel to the first direction X or the second direction Y.

Each of the plurality of lenses LS may be a lenticular lens having a generally semi-cylindrical shape, and the optical member OM may be a lenticular lens array film. The optical member OM may include a Fresnel lens.

The display device 1 may further include a coupling member. The coupling member may be interposed between the display panel DP and the optical member OM to attach them together. The coupling member may be optically transparent. For example, the coupling member may include an optically transparent adhesive or an optically transparent resin.

Figure 2:
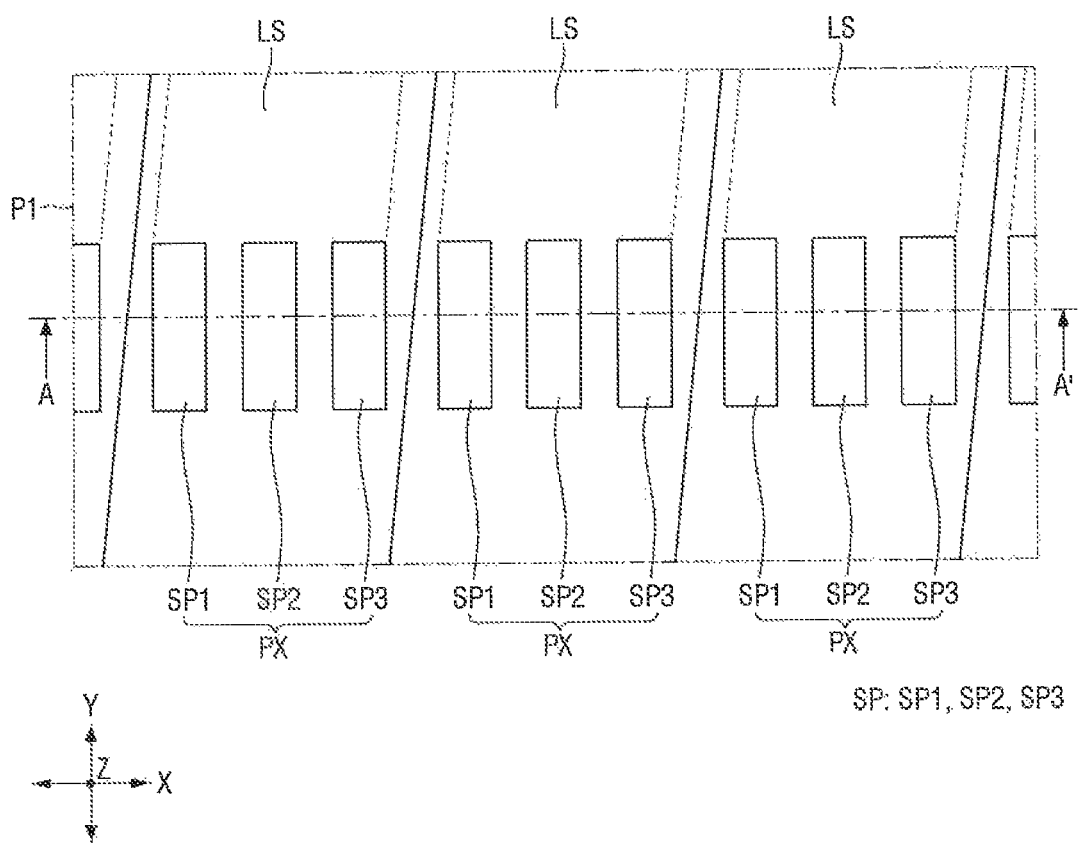
FIG. 2 is an enlarged plan view showing a portion P1 of FIG. 1 according to an embodiment of the inventive concept.
Figure 3:
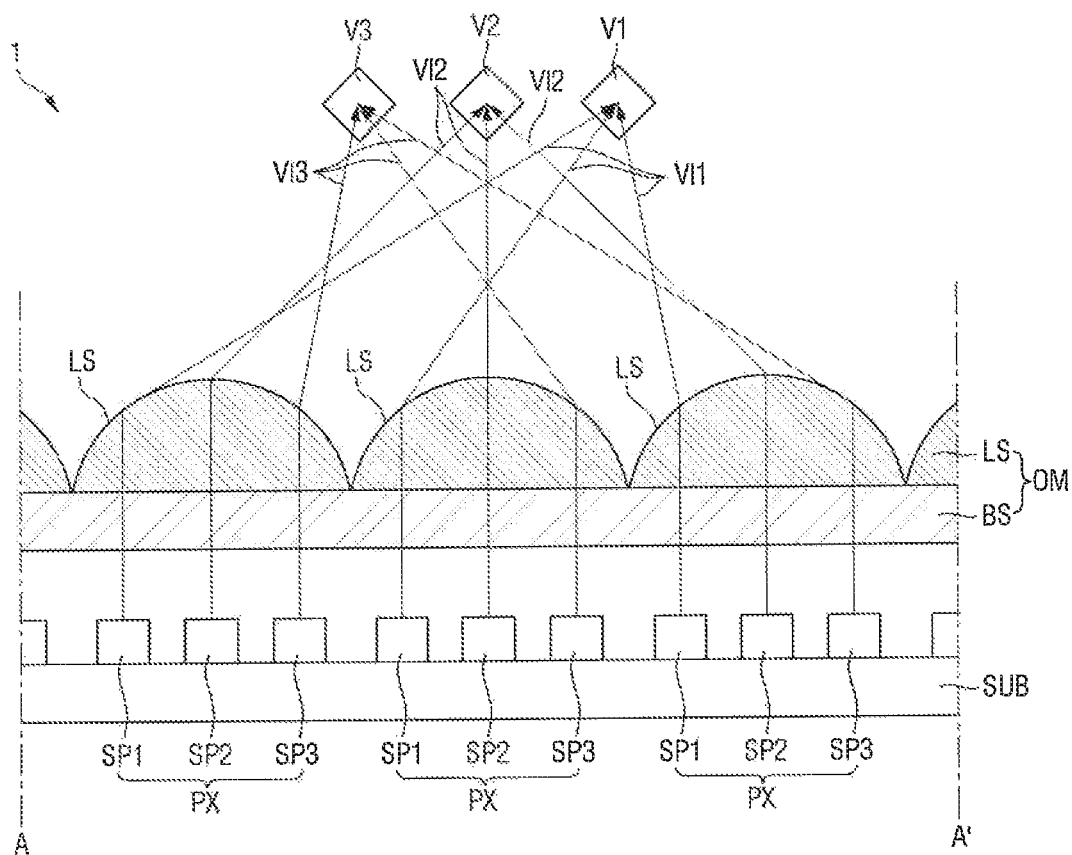
FIG. 3 is a cross-sectional view taken along line A-A' of FIG. 2 according to an embodiment of the inventive concept.

FIG. 2 is an enlarged plan view showing a portion P1 of FIG. 1 according to an embodiment of the inventive concept. FIG. 3 is a cross-sectional view taken along line A-A' of FIG. 2 according to an embodiment of the inventive concept.

FIG. 2 conceptually shows an arrangement of a plurality of lenses LS and a plurality of pixels PX. FIG. 3 conceptually shows a method of implementing a 3D image and viewing angle control of the display device 1. Although FIGS. 2 and 3 show only three pixels PX and three lenses LS of the display panel DP for convenience of illustration, the numbers of pixels PX and lenses LS are not limited thereto.

Referring to FIGS. 2 and 3, the display panel DP may include a substrate SUB.

The substrate SUB may include an organic polymer material such as polyethylene, polyimide, polycarbonate, polysulfone, polyacrylate, polystyrene, polyvinyl chloride, polyvinyl alcohol, polynorbornene, or polyester. The display panel DP may further include another substrate SUB disposed between the base member BS and the plurality of pixels PX.

The plurality of pixels PX may be disposed on the upper surface of the substrate SUB.

Each of the plurality of pixels PX may include a plurality of sub-pixels SP.

A pixel PX may include a group of sub-pixels SP for representing a black-and-white or grayscale image. Each of the sub-pixels SP may be a minimum unit capable of representing a grayscale level.

As shown in FIGS. 2 and 3, three sub-pixels SP may overlap with one lens LS in the thickness direction when viewed from the top, but the inventive concept is not limited thereto. The number of the sub-pixels SP overlapping each lens LS may vary depending on the design of the display device 1, for example, the number of view regions V1, V2, and V3. In addition, in FIG. 3, the plurality of sub-pixels SP does not overlap the boundaries of the plurality of lenses LS when viewed from the top. Alternatively, the sub-pixels SP adjacent to the boundaries of the plurality of lenses LS may overlap with the boundaries of the plurality of lenses LS when viewed from the top.

The plurality of sub-pixels SP may include a first sub-pixel SP1, a second sub-pixel SP2, and a third sub-pixel SP3.

The first sub-pixel SP1 may emit light of a first color, the second sub-pixel SP2 may emit light of a second color, and the third sub-pixel SP3 may emit light of a third color. The first color may be red, the second color may be green, and the third color may be blue. It is, however, to be understood that the inventive concept is not limited thereto.

For example, each of the first sub-pixel SP1, the second sub-pixel SP2, and the third sub-pixel SP3 may have a rectangular shape having shorter sides in the first direction X and longer sides in the second direction Y when viewed from the top. It is, however, to be understood that the inventive concept is not limited thereto. Each of the first sub-pixel SP1, the second sub-pixel SP2, and the third sub-pixel SP3 may have a variety of shapes such as a square, a diamond, a circle, or an oval when viewed from the top.

The first sub-pixel SP1, the second sub-pixel SP2, and the third sub-pixel SP3 may be arranged in the first direction X when viewed from the top. The first sub-pixel SP1, the second sub-pixel SP2, and the third sub-pixel SP3 may be arranged repeatedly in the order of the first sub-pixel SP1, the second sub-pixel SP2, and the third sub-pixel SP3.

As shown in FIG. 2, the first sub-pixel SP1, the second sub-pixel SP2, and the third sub-pixel SP3 may be arranged in an inclined direction with respect to the direction in which the plurality of lenses LS is extended and/or the boundaries of the plurality of lens LS. It is, however, to be understood that the inventive concept is not limited thereto. The first sub-pixel SP1, the second sub-pixel SP2, and the third sub-pixel SP3 may be arranged in a direction substantially perpendicular to the direction in which the plurality of lenses LS is extended and/or the boundaries of the plurality of lens LS.

The plurality of first sub-pixels SP1 may be disposed adjacent to a first side of the lenses LS, e.g., on the left side of FIGS. 2 and 3, the plurality of second sub-pixels SP2 may be disposed at the center of the lenses LS, and the plurality of third sub-pixels SP3 may be disposed adjacent to a second side of the lenses LS, e.g., on the right side of FIGS. 2 and 3.

Referring to FIG. 3, the first sub-pixels SP1, the second sub-pixels SP2, and the third sub-pixels SP3 may provide a first view image VI1, a second view image VI2, and a third view image VI3, respectively. The first view image VI1, the second view image VI2, and the third view image VI3 may form at least a part of a light-field image to be described later.

The first view image VI1 displayed by a plurality of first sub-pixels SP1, the second view image VI2 displayed by a plurality of second sub-pixels SP2, and the third view image VI3 displayed by a plurality of third sub-pixels SP3 may be displayed in different spaces separated from one another in front of the display device 1. The first view image VI1, the second view image VI2, and the third view image VI3 may be refracted by the lenses LS, and provided to the first view region V1, the second view region V2, and the third view region of the display device 1, respectively. The view regions may be viewpoints provided by the display device 1.

For example, as shown in FIG. 3, the second view region V2 may be located in the center area of the display device 1, the first view region V1 may be located in the right area of the display device 1, and the third view region V3 may be located in the left area of the display device 1.

As shown in FIG. 3, lights exiting from the first sub-pixels SP1, lights exiting from the second sub-pixels SP2, and lights exiting from the third sub-pixels SP3 may be refracted at different angles by the plurality of lenses LS. A light exiting from one of the first sub-pixels SP1 may be refracted by a different angle from that of a light exiting from another one of the first sub-pixels SP1. Likewise, a light exiting from one of the second sub-pixels SP2 (or the third sub-pixels SP3) may be refracted by a different angle from that of a light exiting from another one of the second sub-pixels SP2 (or the third sub-pixels SP3). It is, however, to be understood that the inventive concept is not limited thereto. The angles by which the lights exiting from the plurality of sub-pixels SP are refracted may vary depending on the arrangement of the plurality of lenses LS and the plurality of sub-pixels SP. For example, the plurality of lenses and/or the plurality of sub-pixels may be arranged so that the angles by which light exiting from the first sub-pixels SP1 are refracted are substantially all equal. Similarly, depending on the arrangement of the plurality of lenses LS and the plurality of sub-pixels SP, the angles by which the lights emitted from the second sub-pixels SP2 (or the third sub-pixels SP3) are refracted may be substantially all equal.

The first view image VI1, the second view image VI2, and the third view image VI3 may be images generated based on binocular parallax. When a user's left and right eyes watch different view regions among the first view area V1, the second view area V2, and the third view area V3, the user can have 3D experiences due to the binocular parallax.

The first view image VI1, the second view image VI2, and the third view image VI3 may be different images. For example, when the display device 1 is applied to a vehicle display, the first view image VI1 may be a navigation image, the second view image VI2 may be an image displaying vehicle information, and the third view image VI3 may be an entertainment image displaying a movie. In such case, a user located in the first view region V1 may watch the navigation image only, a user located in the second view region V2 may watch the image indicating the vehicle information only, and a user located in the third view region V3 may watch the entertainment image only. That is to say, the display device 1 may show different images to users located at different viewing angles.

In FIGS. 2 and 3, three view images VI1, VI2, and VI3 by the first sub-pixel SP1, the second sub-pixel SP2, and the third sub-pixel SP3 are provided to the three view regions V1, V2, and V3, respectively, for convenience of illustration. It is, however, to be understood that the inventive concept is not limited thereto. That is to say, the number of sub-pixels SP, the number of view images VI1, VI2, and VI3, and the number of view regions V1, V2, and V3 may be determined appropriately depending on the size of the display device 1, and on whether the display device 1 provides a 3D image or a viewing-angle control image.

Figure 4:
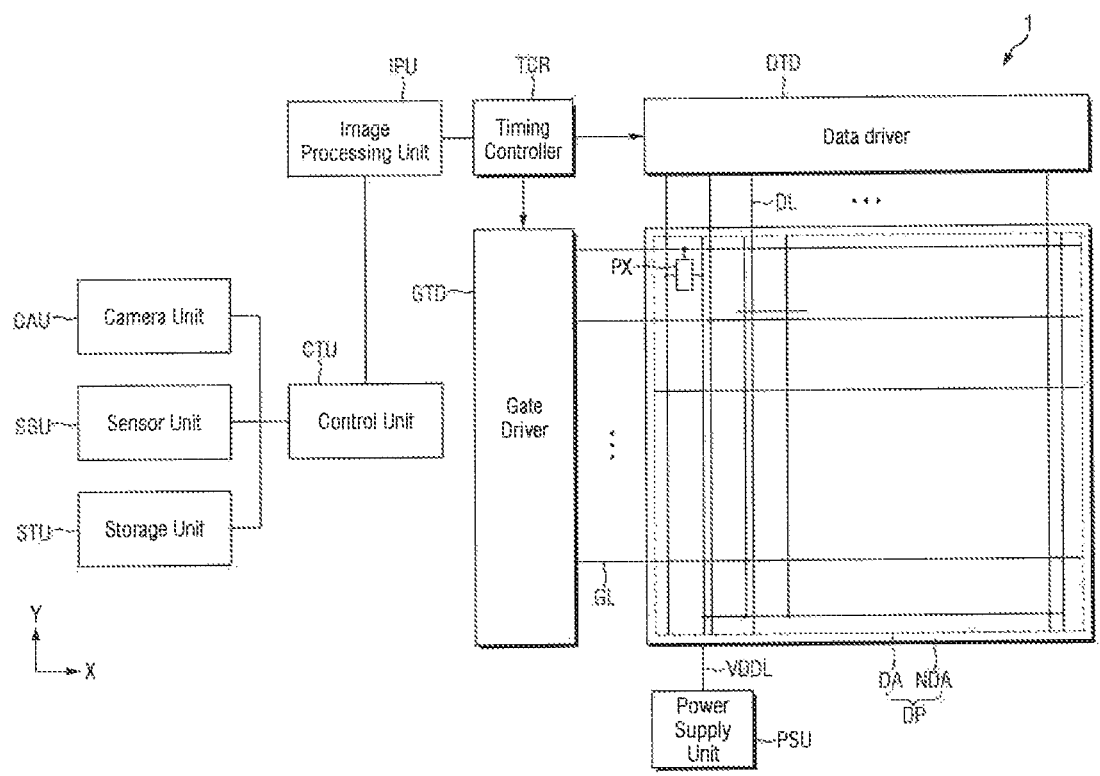
FIG. 4 is a block diagram conceptually showing a configuration of a display device according to an embodiment of the inventive concept.

FIG. 4 is a block diagram conceptually showing a configuration of a display device according to an embodiment of the inventive concept.

Referring to FIG. 4, the display device 1 may further include a plurality of data lines DL, a plurality of gate lines GL, an image processing unit IPU, a timing controller TCR, a data driver DTD, a gate driver GTD, and a power supply unit PSU.

The plurality of data lines DL may be connected between the data driver DTD and the plurality of pixels PX. The plurality of data lines DL may supply data voltages to the plurality of pixels PX. The plurality of data lines DL may be extended in the second direction Y and may be spaced apart from one another in the first direction X.

The plurality of gate lines GL may be connected between the gate driver GTD and the plurality of pixels PX. The plurality of gate lines GL may supply gate signals to the plurality of pixels PX. The plurality of gate lines GL may be extended in the first direction X and may be spaced apart from one another in the second direction Y.

The plurality of pixels PX may be disposed in pixel areas, formed at the intersections of the plurality of data lines DL and the plurality of gate lines GL. Each of the plurality of pixels PX may be connected to at least one gate line GL, at least one data line DL, and a supply voltage line VDDL.

The image processing unit IPU may process image data. The image data may include image data previously stored in a storage unit STU, and image data acquired in real time from a camera unit CAU. The image processing unit IPU may generate output data containing a light-field image IMG_O (see FIG. 7) based on previously stored viewpoint images IMG_V (see FIG. 7) and mapping pattern images IMG_MP (see FIG. 7) as described below, and may provide the output data to the timing controller TCR.

The image processing unit IPU may be implemented by at least one of an application processor (AP), a central processing unit (CPU), or a graphic processing unit (GPU). For example, the image processing unit IPU may be implemented by, but is not limited to, a graphic processing unit (GPU). The image processing unit IPU may be implemented by an application stored in the storage unit STU.

The operations of the image processing unit IPU will be described in more detail below with reference to FIGS. 5 to 14.

The timing controller TCR may receive, for example, a timing synchronization signal from a display driving system. The timing controller TCR may generate a data control signal and a gate control signal based on the timing synchronization signal. The timing controller TCR may control the driving timing of the data driver DTD using the data control signal, and may control the driving timing of the gate driver GTD using the gate control signal. The timing controller TCR may generate pixel data based on the output data generated by the image processing unit IPU, and may coordinate the pixel data appropriately for the arrangement structure of the pixels PX to supply it to the data driver DTD.

The data driver DTD may receive the pixel data and the data control signal from the timing controller TCR. The data driver DTD may generate a data voltage based on the pixel data, and may supply a data voltage to the data lines DL in response to the data control signal. The data voltage may be supplied to the plurality of pixels PX through the data lines DL, to determine the luminance of the plurality of pixels PX.

The gate driver GTD may be disposed in the non-display area NDA of the display panel DP. The gate driver GTD may generate gate signals based on the gate control signal supplied from the timing controller TCR, and may sequentially supply the gate signals to the plurality of gate lines GL in a predetermined order.

The power supply unit PSU may supply the supply voltage VDDL to the display panel DP. The power supply unit PSU may generate the supply voltage VDDL, and may supply the supply voltage VDDL to the plurality of pixels PX through a supply voltage line. The power supply unit PSU may generate a common voltage and supply it to a low-level voltage line of the display panel DP. For example, the supply voltage VDDL may be a high-level voltage for driving the plurality of pixels PX, and the common voltage may be a low-level voltage commonly supplied to the plurality of pixels PX.

The display device 1 may further include a sensor unit SSU, in addition to the camera unit CAU and the storage unit STU described above.

The camera unit CAU may capture an image of an object outside the display device 1. The camera unit CAU may include at least one camera including an image sensor for capturing an outside object to acquire image data. The image data may include a real-time image acquired by capturing an outside object in real time. When the camera unit CAU includes a plurality of cameras, the distance (depth) of an outside object can be measured by the plurality of cameras. In addition, a plurality of viewpoint images IMG_V (see FIG. 7) may be acquired by the plurality of cameras.

The sensor unit SSU may include a means for determining the position of the display device 1, and a means for measuring the distance between the display device 1 and an outside object and/or the depth of the outside object. For example, the sensor unit SSU may include a global positioning system (GPS) module, a wireless fidelity (Wi-Fi) module, a magnetic sensor, a gravity sensor, a gyroscope sensor, a motion sensor, a time of flight (TOF) sensor, an IR sensor, a RGB sensor, etc. The display device 1 may combine and utilize information sensed by two or more of the above-described sensors, but the inventive concept is not limited thereto.

The storage unit STU stores data that supports a variety of features of the display device 1. The storage unit STU may store a program for the operation of a control unit CTU, and may store input and output data items, for example, image data acquired by the camera unit CAU and distance information (depth information) of an outside object acquired by the sensor unit SSU. The storage unit STU may store application data for the operation of the image processing unit IPU, which will be described later, and/or mapping pattern images IMG_MP (see FIG. 7).

The control unit CTU may control the overall operation of the display device 1. The control unit CTU may control at least one of the camera unit CAU, the sensor unit SSU, the storage unit STU, the image processing unit IPU, the timing controller TCR, the data driver DTD, and the gate driver GTD. For example, the control unit CTU may be implemented by at least one of an application processor (AP) or a central processing unit (CPU). It is, however, to be understood that the inventive concept is not limited thereto. The control unit CTU may further include a graphic processing unit (GPU). Although the control unit CTU and the image processing unit IPU are different elements in the example shown in FIG. 4, the inventive concept is not limited thereto. The image processing unit IPU may be included in the control unit CTU.

Figure 7:
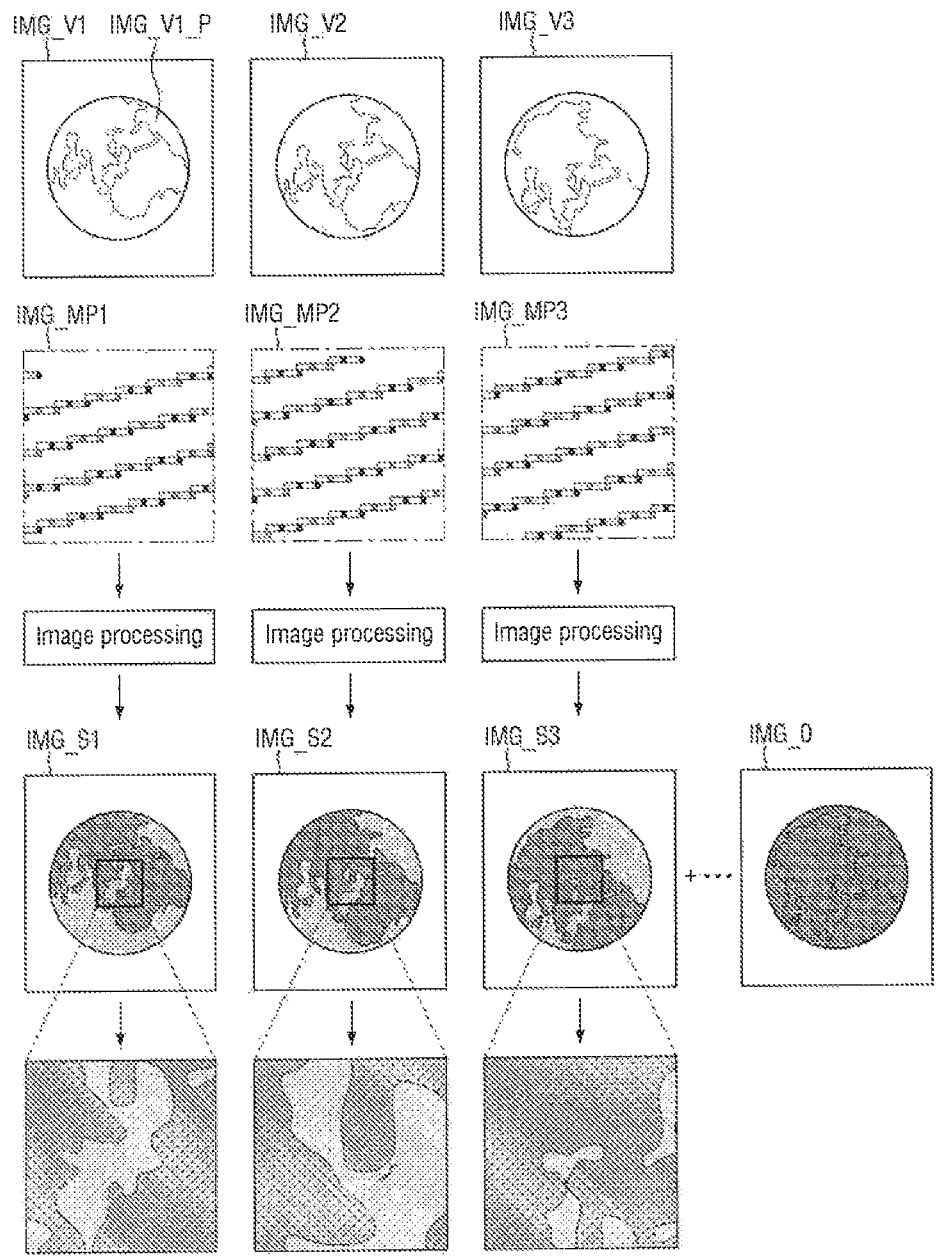
FIG. 7 is a view conceptually showing a process of generating a light-field image according to an embodiment of the inventive concept.

The control unit CTU may control the image processing unit IPU so that a 3D light-field image IMG_O (see FIG. 7) is generated based on the plurality of viewpoint images IMG_V (see FIG. 7) corresponding to the plurality of view regions V1, V2, and V3, and a plurality of mapping pattern images IMG_MP (see FIG. 7).

According to embodiments of the inventive concept, elements of the display device 1, including the image processing unit IPU, the storage unit STU, the sensor unit SSU, the camera unit CAU, and the control unit CTU, may be circuits.

Hereinafter, operations of the display device 1 and a method of controlling the display device 1 will be described in detail with reference to FIGS. 5 to 14.

Figure 5:
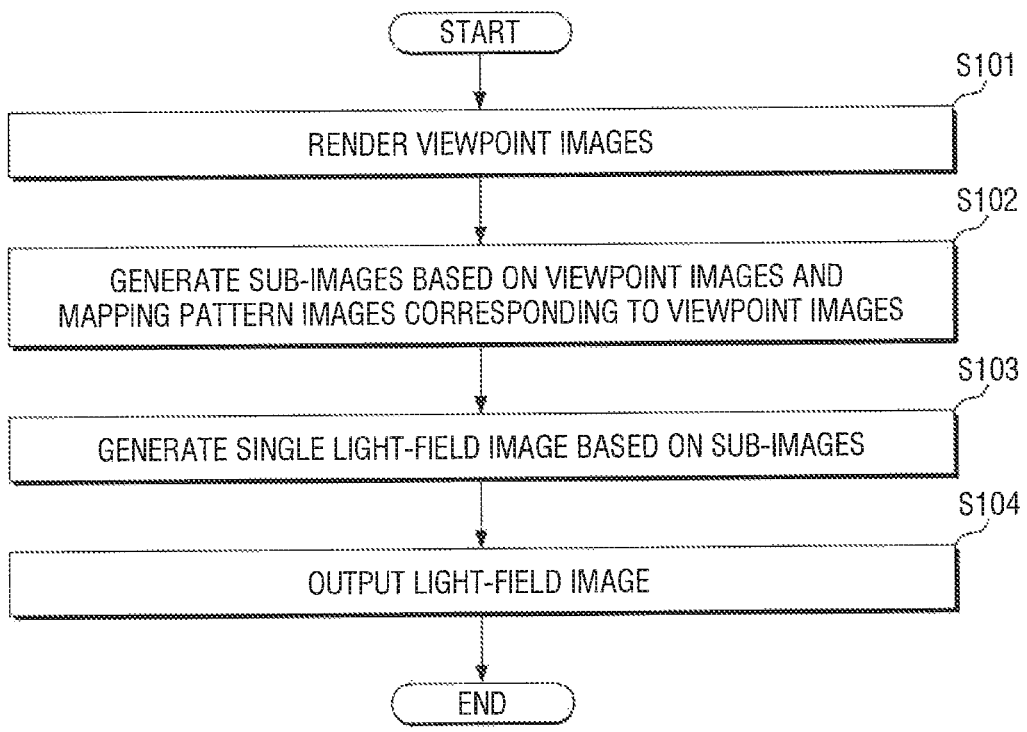
FIG. 5 is a flowchart for illustrating a method for controlling a display device according to an embodiment of the inventive concept.
Figure 6:
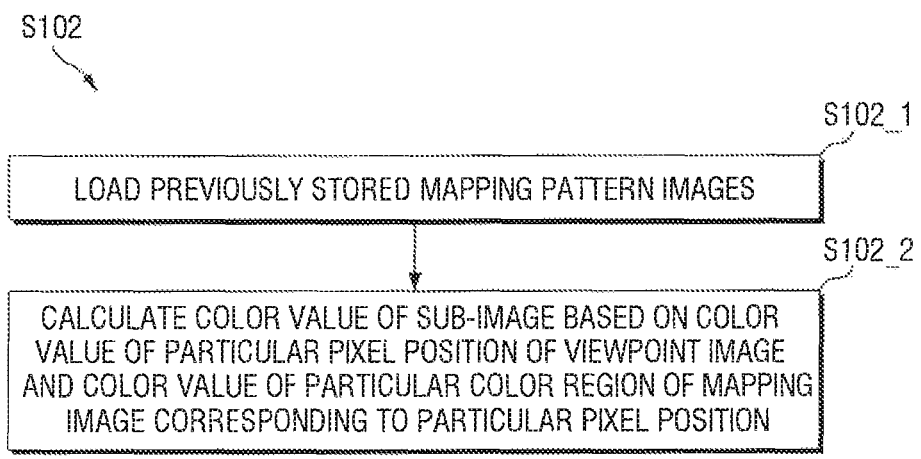
FIG. 6 is a flowchart for illustrating an operation of generating a plurality of sub-images according to an embodiment of the inventive concept.
Figure 8:
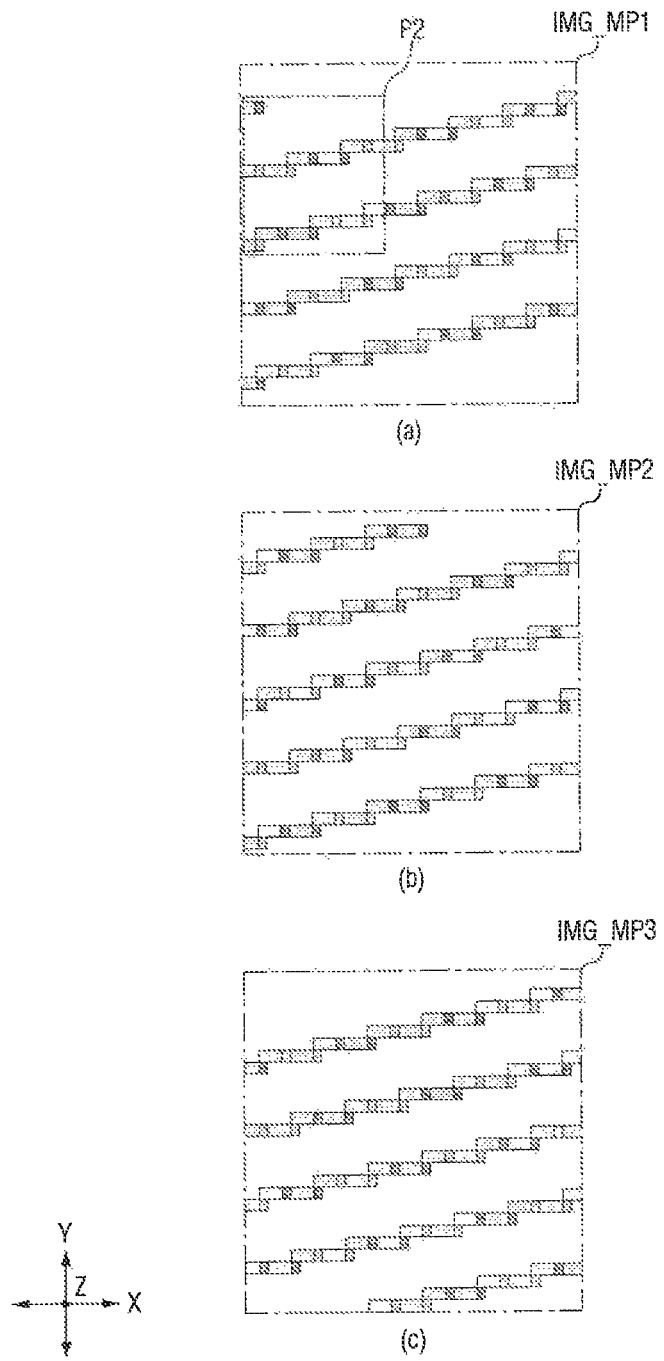
FIG. 8 is a view showing a plurality of mapping pattern images according to an embodiment of the inventive concept.
Figure 9:
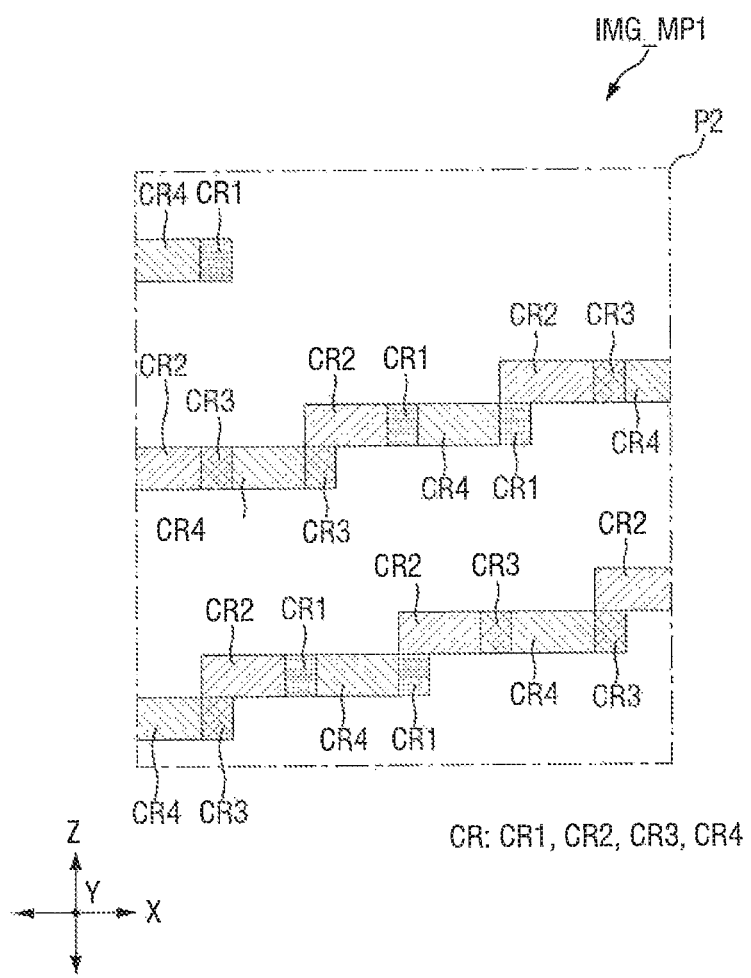
FIG. 9 is an enlarged view showing a portion P2 of FIG. 8 according to an embodiment of the inventive concept.
Figure 10:
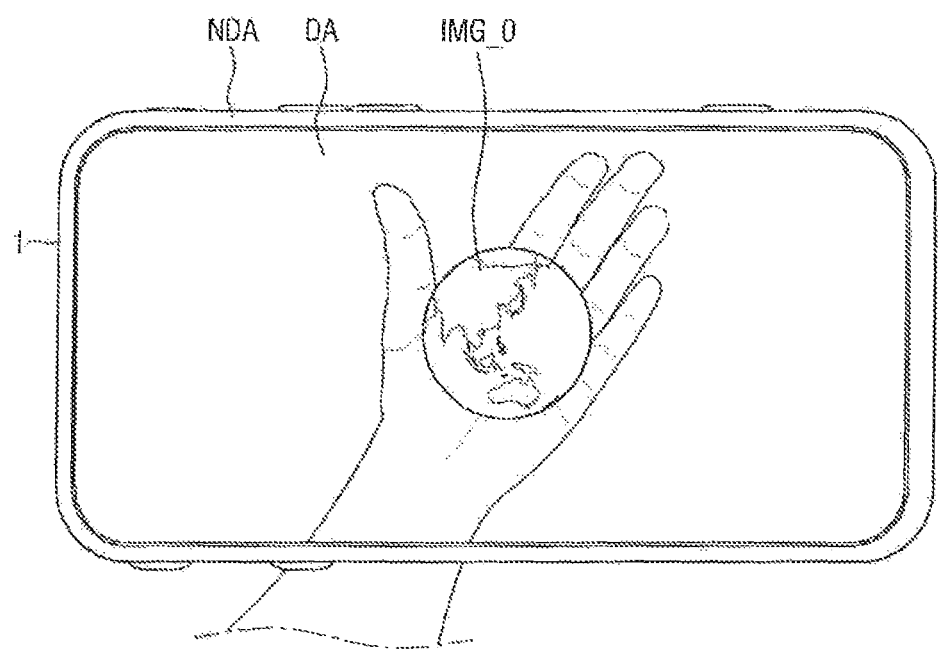
FIG. 10 is a perspective view of a display device on which an augmented reality (AR) image is output according to embodiment of the inventive concept.

FIG. 5 is a flowchart for illustrating a method for controlling a display device according to an embodiment of the inventive concept. FIG. 6 is a flowchart for illustrating an operation of generating a plurality of sub-images according to an embodiment of the inventive concept. FIG. 7 is a view conceptually showing a process of generating a light-field image according to an embodiment of the inventive concept. FIG. 8 is a view showing a plurality of mapping pattern images according to an embodiment of the inventive concept. FIG. 9 is an enlarged view showing a portion P2 of FIG. 8 according to an embodiment of the inventive concept. FIG. 10 is a perspective view of a display device on which an augmented reality (AR) image is output according to an embodiment of the inventive concept.

The method of controlling a display device described below may be performed by the above-described control unit CTU (see FIG. 4).

Referring to FIGS. 5 to 10, a method of controlling a display device according to an embodiment of the inventive concept may include: rendering a plurality of viewpoint images IMG_V (operation S101); generating a plurality of sub-images IMG_S based on the plurality of viewpoint images IMG_V and a plurality of mapping pattern images IMG_MP corresponding to the plurality of viewpoint images IMG_V, respectively (operation S102); generating a single light-field image IMG_O based on the plurality of sub-images IMG_S (operation S103); and outputting the light-field image IMG_O (operation S104).

Referring to FIG. 6, the generating of the sub-images IMG_S (operation S102) may include: loading the plurality of previously stored mapping pattern images IMG_MP (operation S102_1); and calculating color values of the sub-images IMG_S based on color values of particular pixel positions of the viewpoint images IMG_V and color values of particular color regions CR of the mapping pattern images IMG_MP corresponding to the particular pixel positions (operation S102_2).

The method of controlling a display device is not limited to the above-described embodiment, and at least some of the above operations may be omitted, or one or more operations may be added according to embodiments of the inventive concept.

Hereinafter, a method of controlling a display device will be described in detail with reference to FIGS. 7 to 9.

Although three viewpoint images IMG_V and three processes corresponding thereto are illustrated in FIG. 7, the number of viewpoint images IMG_V and the number of processes corresponding to the viewpoint images IMG_V are not limited thereto. The processing of a plurality of viewpoint images IMG_V, a plurality of mapping pattern images IMG_MP, a plurality of sub-images IMG_S, and a light-field image IMG_O to be described later may be performed by a parallel processing method of the GPU. It is, however, to be understood that the inventive concept is not limited thereto. For example, processing may be performed sequentially.

Referring to FIG. 7, the control unit CTU may control the image processing unit IPU so that the plurality of viewpoint images IMG_V corresponding to a plurality of viewpoints are acquired based on 3D modeling data. Each of the viewpoint images IMG_V may include a color value corresponding to the respective pixel position. The viewpoints may refer to virtual capture viewpoints for rendering and/or view regions V1, V2, and V3 provided by the display device 1. The 3D modeling data may be previously stored in the storage unit STU, but the inventive concept is not limited thereto. The 3D modeling data may be generated in real time based on a plurality of image data items acquired from a plurality of cameras of the camera unit CAU, or may be streamed in real time through a communication module that is mounted on the display device 1 and includes a near-/far-field wireless communication means, etc.

The image processing unit IPU may render the plurality of viewpoint images IMG_V in real time so that the size or the angle of the light-field image IMG_O is changed based on the distance information and/or depth information of an outside object acquired in real time from the camera unit CAU and/or the sensor unit SSU.

The image processing unit IPU may render the plurality of viewpoint images IMG_V to a plurality of textures. The textures may include bitmap images having a preset resolution. The textures may be stored in a memory and/or the storage unit STU provided in the image processing unit IPU.

For example, based on the 3D modeling data previously stored in the storage unit STU, a first viewpoint image IMG_V1, a second viewpoint image IMG_V2, and a third viewpoint image IMG_V3 corresponding to the first capture viewpoint, the second capture viewpoint, and the third capture viewpoint (the first view region V1, the second view region V2, and the third view region V3), respectively, may be rendered on a first group of textures. The first group of textures may include a first texture, a second texture, and a third texture corresponding to the first viewpoint image IMG_V1, the second viewpoint image IMG_V2, and the third viewpoint image IMG_V3, respectively.

After the viewpoint images IMG_V are rendered, the control unit CTU may control the image processing unit IPU so that the plurality of mapping pattern images IMG_MP respectively corresponding to the plurality of viewpoint images IMG_V are loaded. The plurality of mapping pattern images IMG_MP may be previously stored in the storage unit STU.

The plurality of mapping pattern images IMG_MP may include a first mapping pattern image IMG_MP1, a second mapping pattern image IMG_MP2, and a third mapping pattern image IMG_MP3 corresponding to the first viewpoint image IMG_V1, the second viewpoint image IMG_V2, and the third viewpoint image IMG_V3, respectively.

The image processing unit IPU may load the plurality of mapping pattern images IMG_MP to a plurality of textures. As described above, the textures may include bitmap images having a predetermined resolution, and may be stored in the memory and/or the storage unit STU provided in the image processing unit IPU. The mapping pattern images IMG_MP may refer to bitmap images loaded into a plurality of textures, based on a plurality of previously stored mapping pattern data items corresponding to the plurality of view regions V1, V2, and V3.

The image processing unit IPU may map the plurality of mapping pattern images IMG_MP to a second group of textures different from the first group of textures. The textures of the second group may include a fourth texture, a fifth texture, and a sixth texture respectively corresponding to the first mapping pattern image IMG_MP1, the second mapping pattern image IMG_MP2, and the third mapping pattern image IMG_MP3.

The mapping pattern images IMG_MP may include a particular pixel position and/or the color value corresponding to the color of the particular pixel position among the pixels of the viewpoint images IMG_V for generating the light-field image IMG_O. Referring further to FIG. 9, the color value may vary depending on a particular pixel position based on a plurality of color regions CR.

The mapping pattern images IMG_MP may contain position information of a particular pixel and color value information corresponding thereto. The particular pixel position may be coordinates of the particular pixel from which the color value is to be extracted to generate sub-images IMG_S corresponding to particular view regions V1, V2, and V3 among the pixels of the viewpoint images IMG_V. The color values of the mapping pattern images IMG_MP may include color values of a first color, a second color, and a third color that are different from one another. The color values of the mapping pattern images IMG_MP may further include an opacity value (or a transparency value).

Referring further to FIG. 8, each of the plurality of mapping pattern images IMG_MP may include a pattern having a certain tendency. The patterns of the plurality of mapping pattern images IMG_MP may be different from one another.

For example, as shown in FIGS. 8(a) to 8(c), each of the first mapping pattern image IMG_MP1, the second mapping pattern image IMG_MP2, and the third mapping pattern image IMG_MP3 may have a pattern of stripes extended in a diagonal direction, e.g., in a direction from the lower left end to the upper right end of the drawing when viewed from the top. Although FIGS. 8(a) to 8(c) show a pattern having five stripes, the relative size, number, and extension direction of the stripes are not limited thereto.

The patterns of the first mapping pattern image IMG_MP1, the second mapping pattern image IMG_MP2, and the third mapping pattern image IMG_MP3 may not overlap one another when viewed from the top. For example, the pattern of the second mapping pattern image IMG_MP2 may have a shape in which the pattern of the first mapping pattern image IMG_MP1 is offset by a first distance in the first direction X. The pattern of the third mapping pattern image IMG_MP3 may have a shape in which the pattern of the second mapping pattern image IMG_MP2 is offset by a second distance in the first direction X. The first distance may be either equal to or different from the second distance.

It is, however, to be understood that the inventive concept is not limited thereto. The patterns of the mapping pattern images IMG_MP may vary depending on the number of view regions V1, V2, and V3 to be provided by the display device 1, the angles of the view regions V1, V2, and V3, and the shape and size of the plurality of lenses LS. The patterns of the first mapping pattern image IMG_MP1, the second mapping pattern image IMG_MP2, and the third mapping pattern image IMG_MP3 may overlap one another at least partially when viewed from the top. Referring further to FIG. 9, the first mapping pattern image IMG_MP1 may include a plurality of color regions CR.

The plurality of color regions CR may have different colors. As shown in FIGS. 8 and 9, at least some of the plurality of color regions CR may be disposed adjacent to each other to form a pattern of the first mapping pattern image IMG_MP1, for example, the above-described stripe pattern.

The plurality of color regions CR may include a first color region CR1 of a first color, a second color region CR2 of a second color, and a third color region CR3 of a third color. The first color, the second color, and the third color may be different from one another. For example, the first color, the second color, and the third color may be red, green, and blue, respectively, but the inventive concept is not limited thereto.

Different color values may be assigned to the plurality of color regions CR. For example, a first color value corresponding to the first color may be assigned to the first color region CR1, a second color value corresponding to the second color may be assigned to the second color region CR2, and a third color value corresponding to the third color may be assigned to the third color region CR3. No color value or the color value of zero may be assigned to regions other than the plurality of color regions CR.

The plurality of color regions CR may further include a fourth color region CR4 of a fourth color.

The fourth color region CR4 may form a pattern of the first mapping pattern image IMG_MP1 together with the first color region CR1, the second color region CR2, and the third color region CR3. A fourth color value corresponding to the fourth color may be assigned to the fourth color region CR4.

The fourth color may be different from the first color, the second color, and the third color. The fourth color may be a color obtained by mixing colors of the color regions CR disposed adjacent to the fourth color region CR4. The fourth color may be a color in which two or more of the first color, the second color, and the third color are mixed. For example, when the first color is red and the third color is blue, the fourth color may be magenta.

The first mapping pattern image IMG_MP1 may further include a fifth color region CR of a fifth color, a sixth color region CR of a sixth color, and a seventh color region CR of a seventh color, which are similar to the fourth color region CR4. The fifth color, the sixth color, and the seventh color may be different from one another, and may be colors in which two or more of the first color, the second color, and the third color are mixed.

At least one of the plurality of color regions CR may have a size different from sizes of the other color regions CR. For example, at least one of the length of the second color region CR2 and the length of the fourth color region CR4 in the first direction X may be greater than that of the first color region CR1 and the third color region CR3. In this instance, the length of the second color region CR2 in the first direction X may be substantially equal to that of the fourth color region CR4, and the length of the first color region CR1 in the first direction X may be substantially equal to that of the third color region CR3 in the first direction X. It is, however, to be understood that the inventive concept is not limited thereto. The size of each of the color regions CR may vary depending on the design of the display device 1.

The mapping pattern images IMG_MP other than the first mapping pattern image IMG_MP1 may also include color regions CR that are substantially identical to or similar to that of the first mapping pattern image IMG_MP1. For example, each of the second mapping pattern image IMG_MP2 and the third mapping pattern image IMG_MP3 may include the first color region CR1, the second color region CR2, the third color region CR3, and the fourth color region CR4.

Referring back to FIG. 7, after the plurality of mapping pattern images IMG_MP is loaded, the control unit CTU may control the image processing unit IPU so that it performs image processing to generate the plurality of sub-images IMG_S.

The image processing unit IPU may perform the image processing to generate the plurality of sub-images IMG_S corresponding to the plurality of view regions V1, V2, and V3, based on the plurality of viewpoint images IMG_V and the plurality of mapping pattern images IMG_MP.

For example, the image processing unit IPU may generate the plurality of sub-images IMG_S through an operation based on the color values of the plurality of viewpoint images IMG_V and the color values of the plurality of mapping pattern images IMG_MP. The color values of the plurality of viewpoint images IMG_V may be the color values of the pixels forming the plurality of viewpoint images IMG_V.

The image processing unit IPU may extract the color values of the plurality of viewpoint images IMG_V, and multiply the color values of the plurality of viewpoint images IMG_V by the color values of the mapping pattern images IMG_MP corresponding thereto, to generate a single sub-image IMG_S.

The plurality of sub-images IMG_S may include a first sub-image IMG_S1, a second sub-image IMG_S2, and a third sub-image IMG_S3 corresponding to the first viewpoint image IMG_V1, the viewpoint image IMG_V2, and the viewpoint image IMG_V3 (the first view region V1, the second view region V2, and the third view region V3), respectively.

To generate the first sub-image IMG_S1, the color value of a particular pixel position for providing the first view region V1, e.g., a first pixel position IMG_V1_P (the first pixel), may be extracted. The color value of the particular pixel position may include a plurality of sub-color values.

The plurality of sub-color values may include a first sub-color value, a second sub-color value, a third sub-color value, and a fourth sub-color value which represent a first color, a second color, a third color, and a transparency, respectively.

Likewise, the color value may be extracted from a particular color region CR corresponding to the first pixel position IMG_V1_P among the plurality of color regions CR of the first mapping pattern image IMG_MP1, for example, the fourth color region CR4 at the top of the first mapping pattern image IMG_MP1.

The color value of the particular color region CR may include a plurality of sub-color values. The plurality of sub-color values may include a fifth sub-color value, a sixth sub-color value, a seventh sub-color value, and an eighth sub-color value which represent the first color, the second color, the third color, and the transparency, respectively. The sub-color values of the particular color region CR may respectively correspond to sub-color values of the particular pixel position. The sub-color values of the particular color region CR may vary depending on the color of the particular pixel position to be obtained from the viewpoint images IMG_V to generate the sub-images IMG_S.

It is to be noted that the association between the first pixel position IMG_V1_P and the fourth color region CR4 as described above is exemplary, and the association between the particular pixel position of the viewpoint images IMG_V and the particular color region CR may vary depending on the design of the display device 1.

Subsequently, the color value of the pixel position (pixel) forming the sub-images IMG_S may be calculated based on the color value of the particular pixel position and the color value of the color region CR corresponding to the particular pixel position. The color value of the sub-images IMG_S may include a plurality of sub-color values. The plurality of sub-color values may include a ninth sub-color value, a tenth sub-color value, an eleventh sub-color value, and an twelfth sub-color value which represent the first color, the second color, the third color, and the transparency, respectively.

For example, the ninth sub-color value may be calculated by multiplying the first sub-color value by the fifth sub-color value, the tenth sub-color value may be calculated by multiplying the second sub-color value by the sixth sub-color value, the eleventh sub-color value may be calculated by multiplying the third sub-color value by the seventh sub-color value, and the twelfth sub-color value may be calculated by multiplying the fourth sub-color value by the eighth sub-color value.

The image processing as described above may be implemented by, but is not limited to, the following shader code:

$$\text{float } r = viewColor \cdot r;$$
$$\text{float } g = viewColor \cdot g;$$
$$\text{float } b = viewColor \cdot b;$$
$$\text{float } a = viewColor \cdot a;$$
$$vec4 \; patternColor = (r, g, b, a);$$
$$r + = (patternColor \cdot r * patternColor \cdot a) * viewColor \cdot r;$$
$$g + = (patternColor \cdot g * patternColor \cdot a) * viewColor \cdot g;$$
$$b + = (patternColor \cdot b * patternColor \cdot a) * viewColor \cdot b;$$
$$a + = (patternColor \cdot a * patternColor \cdot a) * viewColor \cdot a;$$

The viewColor may represent the color of the viewpoint images IMG_V, and the patternColor may represent the color of the mapping pattern images IMG_MP.

For example, if the first sub-color value, the second sub-color value, the third sub-color value, and the fourth sub-color value of the first pixel position IMG_V1_P are 0.25, 0.5, 0.32, and 1.0, respectively, and the fifth sub-color value, the sixth sub-color value, the seventh sub-color value, and the eighth sub-color value of the fourth color region CR4 are 1, 0, 1, and 1, respectively, 0.25, 0, 0.32, and 1 may be calculated as the ninth sub-color value, the tenth sub-color value, the eleventh sub-color value, and the twelfth sub-color value, respectively, as below:

$$\text{float } r = 0.25;$$
$$\text{float } g = 0.5;$$
$$\text{float } b = 0.32;$$
$$\text{float } a = 1.0;$$
$$vec4 \; patternColor = (1, 0, 1, 1);$$
$$r + = (1*1)*0.25 = \; > 0.25;$$
$$g + = (0*0)*0.5 = \; > 0;$$
$$b + = (1*1)*0.32 = \; > 0.32;$$
$$a + = (1*1)*1 = \; > 1;$$

In other words, the color value of the particular pixel position of the viewpoint images IMG_V to generate particular sub-images IMG_S may be selectively extracted by the operation using the shader as described above.

Likewise, the sub-images IMG_S other than the first sub-image IMG_S1 may be generated via image processing identical or similar to the image processing applied to the first sub-image IMG_S1. For example, the second sub-image IMG_S2 may be generated by a shader based on the color value of the second viewpoint image IMG_V2 and the color value of the second mapping pattern image IMG_MP2. The third sub-image IMG_S3 may be generated by a shader based on the color value of the third viewpoint image IMG_V3 and the color value of the third mapping pattern image IMG_MP3. The plurality of sub-images IMG_S as described above may be generated simultaneously by a parallel processing method.

After the plurality of sub-images IMG_S are generated, the control unit CTU may control an image output unit so that it generates a single light-field image IMG_O from the plurality of sub-images IMG_S. The image output unit may generate the light-field image IMG_O by merging the plurality of sub-images IMG_S. Although three sub-images IMG_S are merged into a single light-field image IMG_O in the example shown in FIG. 7, the number of merged sub-images IMG_S is not limited to three.

Referring to FIG. 10, after the light-field image IMG_O has been generated by the image processing unit IPU, the control unit CTU may control the display panel DP so that it outputs the light-field image IMG_O to the display area DA. Referring to FIG. 4, for example, the control unit CTU may transmit the image data of the generated light-field image IMG_O to the timing controller TCR, and the timing controller TCR may control the data driver DTD and the gate driver GTD so that the light-field image IMG_O is output to the display area DA based on the received image data.

As described above, the control unit CTU may control the image processing unit IPU so that the light-field image IMG_O is displayed differently based on the distance information and/or the depth information acquired from the sensor unit SSU and/or the camera unit CAU.

The light-field image IMG_O may be changed in association with the distance between an outside object and the display device 1, the angle at which an outside object is captured, etc. For example, the content, size, and/or shape of the light-field image IMG_O may be changed according to the distance information and/or the depth information. Further, the control unit CTU may display the light-field image IMG_O differently based on the position of the display device 1 calculated by a GPS module or a Wi-Fi module.

The control unit CTU may control the image processing unit IPU so that the light-field image IMG_O and a real-time image captured by the camera unit CAU are displayed together. The image processing unit IPU may process them so that the light-field image IMG_O is superimposed on the real-time image. The light-field image IMG_O may be output so that it is recognized as a 3D image by the user, while the real-time image may be output so that it is recognized as a 2D image by the user. It is, however, to be understood that the inventive concept is not limited thereto.

A plurality of real-time images may be processed in the same or similar manner with the image processing method illustrated in FIG. 7, and may be output so that it is recognized as a 3D image by the user.

The light-field image IMG_O may be an augmented reality (AR) image. If a marker image included in an image of an outside object acquired by the camera CAU is recognized, the control unit CTU may control the image processing unit IPU so that the light-field image IMG_O is generated, and may control the display panel DP so that the AR image is output to the display area DA based on the generated light-field image IMG_O.

The marker image may include an object, a body, and a surrounding environment. For example, the control unit CTU may control the image processing unit IPU so that at least one of the contents, position, size, and shape of the AR image is changed based on the distance and/or angle of the display device 1 relative to the object, the body, and the surrounding environment recognized as the marker image.

FIG. 11 is a table comparing the number of frames per second between a pixel mapping method and a mapping pattern image processing method according to the embodiment of the inventive concept.

The table shown in FIG. 11 shows test results of the numbers of frames per second when images of thirty-nine viewpoints are output as AR images based on a resolution of 2,960×1,440 in the display device 1, for example, a Galaxy 8 terminal equipped with a Samsung Exynos AP and ARM Mali-G71 eicosa-core GPU.

To output the light-field image IMG_O, a pixel mapping method or a mapping pattern image method may be used. According to the pixel mapping method, a color value is extracted through a complex conditional statement by circulating all pixels of the acquired viewpoint images IMG_V. In contrast, according to the mapping pattern image method, the above-described mapping pattern images IMG_MP are used.

The display device 1 and the method of controlling the display device according to the above-described embodiment of the inventive concept can significantly improve the image processing speed by employing a plurality of mapping pattern images IMG_MP corresponding to a plurality of view regions V1, V2, and V3.

For example, image processing of a light-field display device may require very large memory, and may have to perform an operation resulting in a large number of loads if data is processed using logic circulating all pixels with a high resolution, e.g., the pixel mapping method. In particular, according to the pixel mapping method, each frame has a long processing time, and even if a parallel processing method is applied, only one or two images are generated per second, making it difficult to process real-time images. In contrast, the display device 1 and the method of controlling the display device 1 according to embodiments of the inventive concept use parallel processing and the mapping pattern images IMG_MP to perform image processing through a simple operation during real-time rendering. As a result, the 3D light-field image IMG_O can be synthesized and output in real time.

For example, as shown in FIG. 11, when one viewpoint is processed, the number of frames per second according to the pixel mapping method is 2.72, and the number of frames per second according to the mapping pattern image method is 3.53. In addition, when two, three, and seven viewpoints are processed in parallel, the number of frames per second of the mapping pattern image method can be greatly improved to 5.92, 7.1, and 8.33, respectively.

In other words, when the mapping pattern image method is employed, the performance of the display device 1 that processes the light-field image IMG_O, particularly, the real-time processing performance, can be greatly improved.

Figure 12:
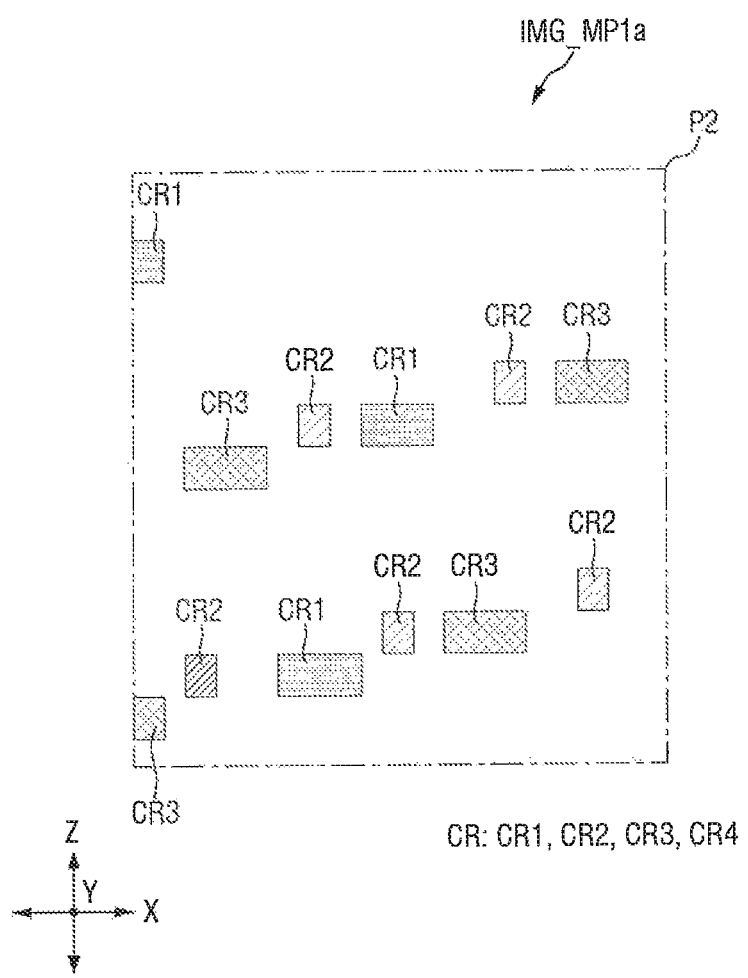
FIG. 12 is a view showing a mapping pattern image according to an embodiment of the inventive concept.

FIG. 12 is a view showing a mapping pattern image according to an embodiment of the inventive concept.

Referring to FIG. 12, a first mapping pattern image IMG_MP1a may have a different pattern according to the number of view regions V1, V2, and V3 provided by the display device 1.

For example, the plurality of color regions CR may be arranged in a diagonal direction, similar to the embodiment of FIG. 7. It is to be noted that the color regions CR may have a size smaller than that of the embodiment of FIG. 7, for example, a smaller width in the first direction X, and may be spaced apart from one another.

Unlike the embodiment of FIG. 7, the first mapping pattern image IMG_MP1a may not include a color region CR having a color in which the first color, the second color, and the third color are mixed. For example, the first mapping pattern image IMG_MP1a may include no fourth color region CR4. In other words, the first mapping pattern image IMG_MP1a may include, but is not limited to, only the first color region CR1, the second color region CR2, and the third color region CR3.

As described above, the size and arrangement of the plurality of color regions CR may vary depending on the number of view regions V1, V2, and V3 provided by the display device 1. For example, the light-field image IMG_O provided using the plurality of mapping pattern images IMG_MP having a shape similar to the first mapping pattern image IMG_MP1a of FIG. 12 may provide more view regions V1, V2, and V3 than the light-field image IMG_O provided using the mapping pattern images IMG_MP having a shape similar to the first mapping pattern image IMG_MP1 of FIG. 7. It is, however, to be understood that the inventive concept is not limited thereto.

The embodiment of FIG. 12 is substantially identical to the embodiment of FIG. 7 except for the pattern of the plurality of color regions CR; therefore, redundant descriptions will be omitted.

Figure 13:
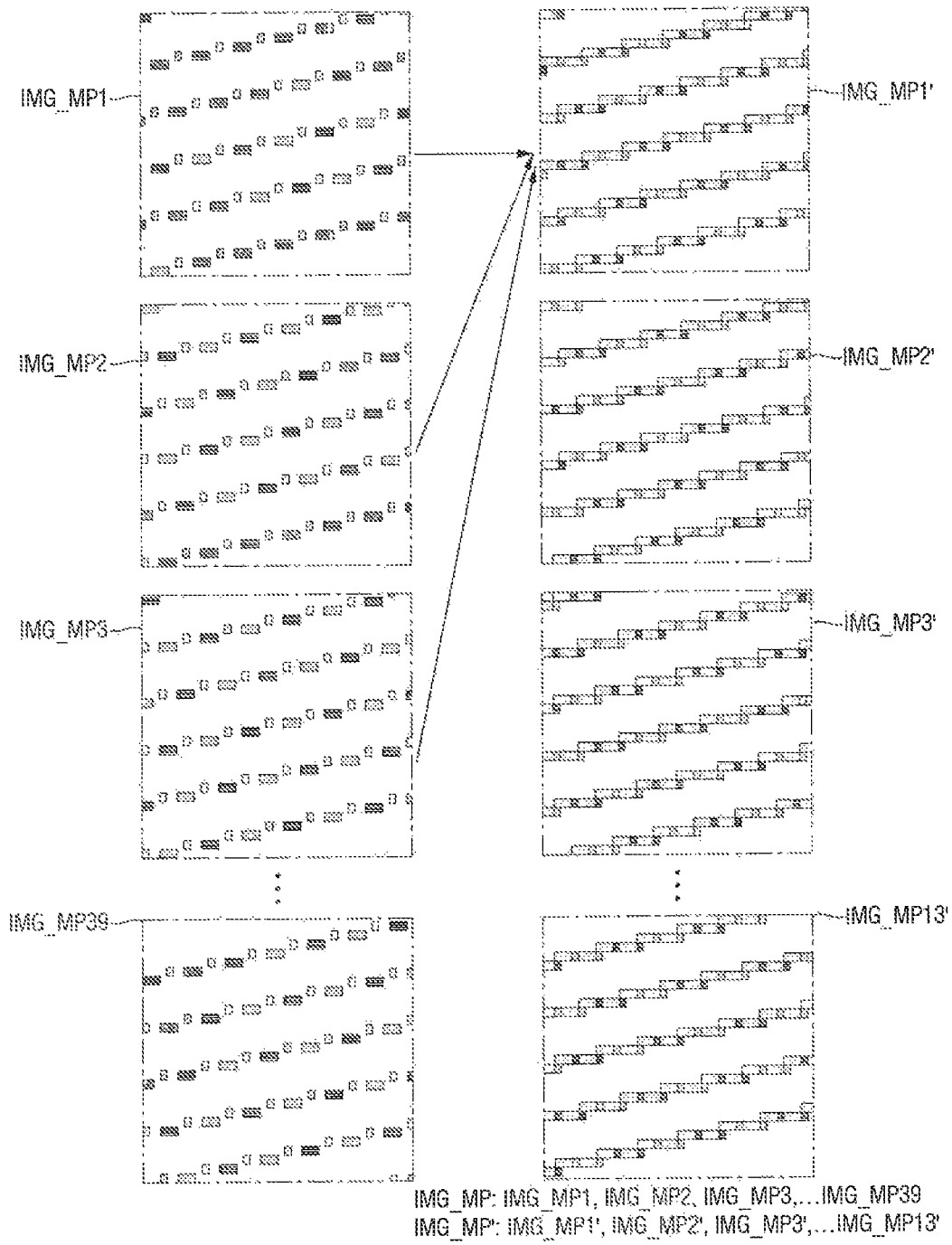
FIG. 13 is a view showing conversion of mapping pattern images according to an embodiment of the inventive concept.

FIG. 13 is a view showing conversion of mapping pattern images according to an embodiment of the inventive concept.

Referring to FIGS. 3, 7, and 13, the number of a plurality of mapping pattern images IMG_MP may vary depending on the number of view regions to be provided by the display device 1.

The control unit CTU may control the image processing unit IPU so that the number of view regions provided by the display device 1 is changed. The image processing unit IPU may perform image processing that synthesizes new mapping pattern images IMG_MP' from existing mapping pattern images IMG_MP based on the number of view regions provided by the display device 1.

For example, as shown on the left side of FIG. 13, when the display device 1 provides thirty-nine view regions, the image processing unit IPU may generate the light-field image IMG_O providing thirty-nine view regions based on the thirty-nine mapping pattern images IMG_MP corresponding to them, respectively. As shown on the right side of FIG. 13, when the display device 1 provides thirteen view regions, the image processing unit IPU may convert the previously stored thirty-nine mapping pattern images IMG_MP into thirteen mapping pattern images IMG_MP', and may generate the light-field image IMG_O providing the thirteen view regions based on the thirteen mapping pattern images IMG_MP'.

FIG. 14 is a table showing changes in the number of frames per second due to conversion of mapping pattern images according to an embodiment of the inventive concept.

The table shown in FIG. 14 shows test results of the numbers of frames per second when thirty-nine view regions are provided and the number of frames per second when thirteen view regions are provided based on a resolution of 2,960×1,440 in the display device 1, for example, a Galaxy 8 terminal equipped with a Samsung Exynos AP and ARM Mali-G71 eicosa-core GPU.

Referring to FIGS. 13 and 14, as described above, by adjusting the number of mapping pattern images IMG_MP according to the number of view regions or images to be provided, it is possible to greatly improve the processing performance of the display device 1.

For example, if the display device 1 provides thirty-nine view regions, the average number of frames per second is 7.7, and if the display device 1 provides thirteen view regions, the average number of frames per second is 19.5. In other words, it is possible to improve the performance of the display device 1 by appropriately adjusting the number of the mapping pattern images IMG_MP according to the number of view regions provided by the display device 1 or the number of viewpoint images IMG_V.

For example, when the pixel mapping method is used, a complex operation must be performed for each frame processing to reduce the number of view regions. In contrast, in the display device 1 and the method of controlling the display device 1 according to embodiments of the inventive concept, such a complex operation is performed in advance through simple image processing that merges the mapping pattern images IMG_MP, and thus the number of view regions to be provided by the display device 1 can be changed as desired, and the processing speed of the display device 1 can be greatly improved.

While the inventive concept has been shown and described with reference to embodiments thereof, it will be apparent to those of ordinary skill in the art that various changes in form and details may be made thereto without departing from the spirit and scope of the inventive concept as set forth by the appended claims.

What is claimed is:

1. A method of controlling a display device, the method comprising:
   rendering a plurality of viewpoint images;
   generating a plurality of sub-images based on the plurality of viewpoint images and a plurality of mapping pattern images corresponding to the plurality of viewpoint images,
   wherein each of the plurality of sub-images corresponds to one of the plurality of mapping pattern images, and each of the plurality of mapping pattern images corresponds to one of the plurality of viewpoint images,
   wherein generating the plurality of sub-images comprises:
      loading the plurality of mapping pattern images, wherein the plurality of mapping pattern images are previously stored; and
      for each sub-image, calculating a color value based on a color value of a particular pixel position in the corresponding viewpoint image among the plurality of viewpoint images and on a color value of a particular color region corresponding to the particular pixel position in the corresponding mapping pattern image among the plurality of mapping pattern images;
   generating a single light-field image by merging the plurality of sub-images; and
   outputting the single light-field image.

2. The method of claim 1, wherein rendering the plurality of viewpoint images comprises rendering the plurality of viewpoint images to a plurality of textures, based on previously stored 3D modeling data.

3. The method of claim 1, wherein calculating the color values of the plurality of sub-images is performed based on a plurality of sub-color values indicating a plurality of colors and an opacity.

4. The method of claim 1, wherein calculating the color values of the plurality of sub-images comprises selectively extracting color values of the plurality of viewpoint images by using the color values of the particular color regions of the plurality of mapping pattern images.

5. The method of claim 1, wherein loading the plurality of mapping pattern images comprises loading a mapping pattern image to a texture different from a texture to which the plurality of viewpoint images are rendered.

6. The method of claim 1, wherein generating the plurality of sub-images is performed by a parallel processing method using a shader.

7. The method of claim 1, wherein outputting the single light-field image comprises changing at least one of contents, position, size, or shape of the single light-field image in real time based on a distance to an outside object.

8. The method of claim 1, wherein outputting the single light-field image comprises outputting the single light-field image to be superimposed on a real-time image captured by a camera.

9. The method of claim 8, wherein the single light-field image is an augmented reality (AR) image.

10. The method of claim 1,
    wherein the plurality of sub-images is generated in parallel.

11. The method of claim 1, wherein each of the plurality of mapping pattern images includes a plurality of color regions including at least two different colors.

* * * * *